United States Patent [19]

Rothaemel et al.

[11] 4,204,710

[45] May 27, 1980

[54] RESCUE NET

[75] Inventors: Günther Rothaemel, Witten; Gerd Fengels, Hagen, both of Fed. Rep. of Germany

[73] Assignee: Bruggemann & Brand KG, Fed. Rep. of Germany

[21] Appl. No.: 930,240

[22] Filed: Aug. 2, 1978

[30] Foreign Application Priority Data

Aug. 8, 1977 [DE] Fed. Rep. of Germany ....... 2735656

[51] Int. Cl.² .............................................. B66C 1/12
[52] U.S. Cl. .................................................. 294/77
[58] Field of Search ...................... 294/77, 74, 75, 76, 294/83 R, 83 A, 67 E, 67 EA; 105/366 E, 377, 466, 468, 469, 52 E; 244/137 R; 214/10.5 R; 182/138–140

[56] References Cited

U.S. PATENT DOCUMENTS

| 3,765,711 | 10/1973 | Hammond | 294/77 |
| 3,827,745 | 8/1974 | Pugh | 294/77 |
| 3,961,585 | 6/1976 | Brewer | 294/77 |

*Primary Examiner*—James B. Marbert
*Attorney, Agent, or Firm*—Robert E. Burns; Emmanuel J. Lobato; Bruce L. Adams

[57] ABSTRACT

The invention relates to a cage-like rescue net which can be attached to a helicopter. The net has a bottom portion forming a floor for persons or articles to be rescued and an outer net like peripheral wall which has at least one access opening. The bottom portion comprises two halves which can be pivoted towards one another, to enclose the remaining portions of the rescue net, about a common axis. The two halves can be fixed in the open position in which they form the floor.

17 Claims, 11 Drawing Figures

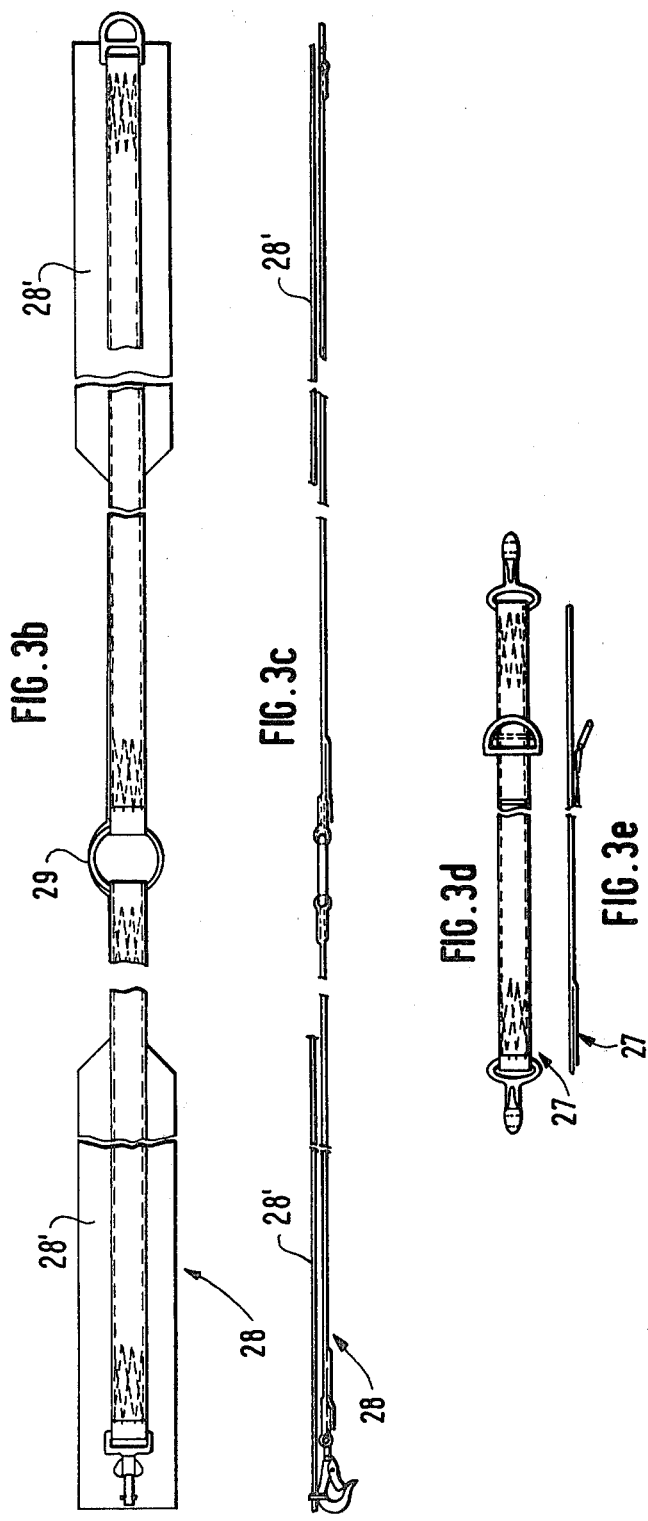

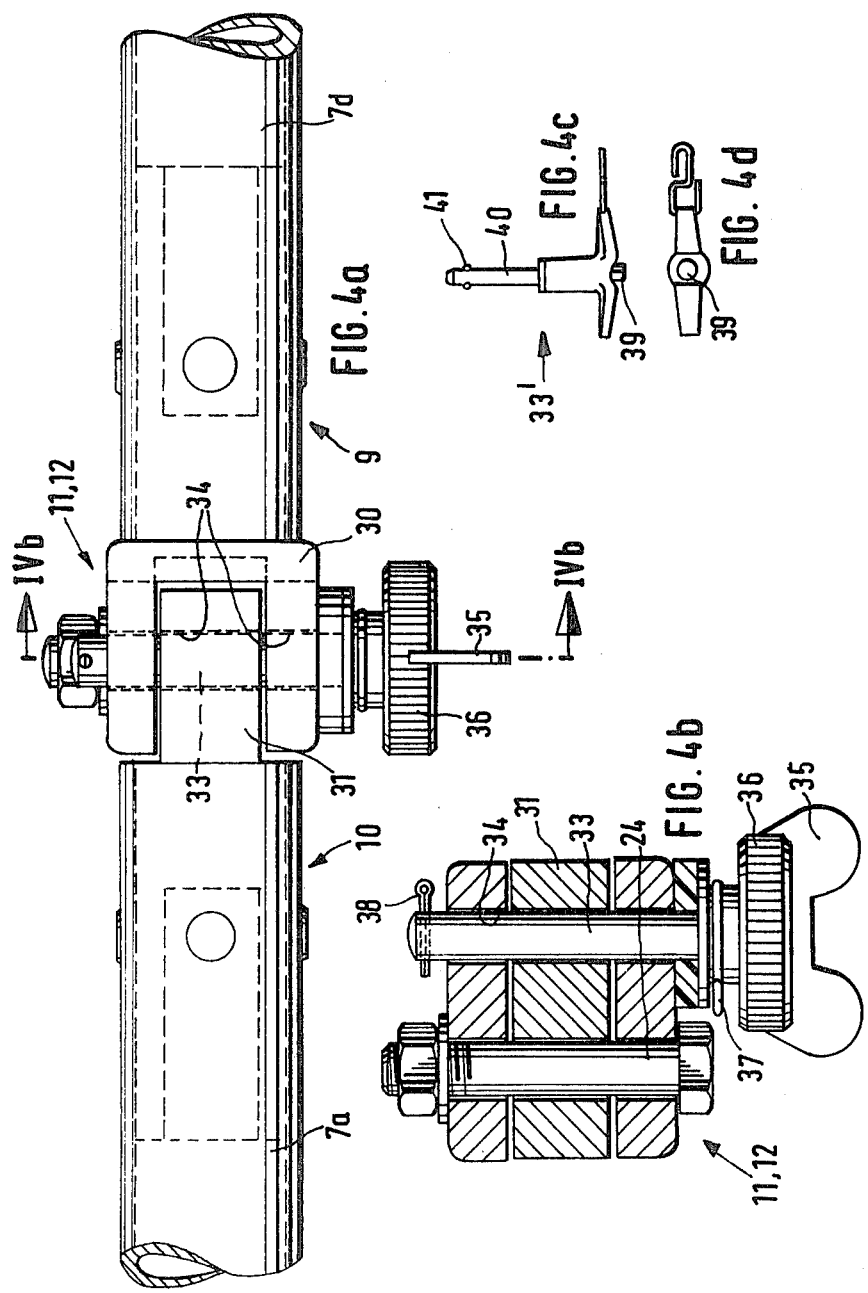

RESCUE NET

The invention relates to a cage-like rescue net for use in the rescue of persons and articles, which net can be attached to a helicopter indirectly through its load hook or by means of auxiliary straps, the net having a bottom portion acting as a floor for the persons or articles to be rescued and a peripheral wall which includes at least one opening for access.

With this type of rescue net and using a helicopter, hovering over the site of an accident, to lower the net, people can be rescued for example from the sea, high snow drifts or burning skyscrapers.

A known rescue net of the above-mentioned type consists of a structure having two circular tube frames, and a plurality of cables, in the center of which the persons to be rescued are held. A lower one of the spaced-apart tube frames is fitted with diametrically extending cables to form a floor. Between the upper and lower circular tube frames extend supporting cables allowing formation of an approximately frustoconical cage-like structure.

The chief disadvantage of this kind of rescue net, which is generally intended for a large number of persons, lies in its very bulky construction, and these rescue nets, consisting of large circular tube frames and rigid supporting cables as they do, cannot be folded and must therefore be carried outside and beneath the helicopter, even during transport from the airport to the area of use. Transport of the nets is hence laborious and time-consuming.

A further disadvantage consists in the difficulty of storing this kind of net in order to protect them from damage and the effects of weathering.

In accordance with the invention, a cage-like rescue net has a bottom portion forming a floor for persons or articles to be rescued and an outer net-like peripheral wall which has at least one access opening; the bottom portion comprises two halves which can be pivoted towards one another, to enclose the remaining portions of the rescue net, about a common axis, and which can be fixed in the open position in which they form the floor.

The bottom portion itself thus forms a closure for the rescue net when collapsed. The pivot direction of the two halves, connected e.g. in hinge fashion, is such that they enclose the upper portions of the net, which are folded over the bottom portion, in a jaw-like manner, thus allowing rapid unfolding and easy collapse of the rescue net. Furthermore, additional packaging means are thereby eliminated, as the bottom portion itself forms these.

As the bottom portion is reduced to half its area and the remaining net portions can be received between its two halves, the rescue net is very convenient to handle when collapsed and can be transported in the helicopter itself when packed in this way.

To secure the bottom portion in its open position, there are provided suitable means which prevent collapse of the flaps, for example on loading of the bottom surface with a person being held.

Preferably, the bottom portion consists of an outer main frame in the form of a square, to and within which is fixed a net forming the floor. In this way is obtained, on the one hand, a particularly simple and lightweight construction of the bottom portion, which allows enclosure of the rescue net with the flexible net surfaces of the main frame, which form a receptable, and on the other hand advantageous ultilization of the area of the floor with persons lying down and low swinging amplitude when for example the straight side of the frame abuts against a building wall.

The two halves hinged together and forming the main frame may each consist of a U-shaped frame member of roughly identical size.

To further reduce the weight of the rescue net, the main frame may be manufactured from individual tubes such as aluminum tubes. The main frame is preferably manufactured from four tubes of equal diameter, with the individual members bent to form the individual corners of the frame.

The advantage of this kind of main frame formed from individual tube sections, which, e.g. each taper at one end, consists in that first the main net can be manufactured, then the frame members can be introduced through the outer loops of the main net and then fitted together and riveted to form the main frame. It is thus possible to fix the main net tautly.

Also, to reduce weight, the joint connection between the U-shaped frame members need not be made by a single joint extending along their pivot axis, but by individual joints complementing the frame members to form a continuous main frame. In this way the main frame is free in the middle and can be spanned by a single continuous net.

Fork joints which can be pivoted about hinge pins are therefore preferably used. If the fork of one frame member and the central hinge plate of the other frame member both extend laterally and a hole is made therein for a locking pin, the frame members or the halves of the bottom portion can be fixed in their open position forming the bottom floor, so that the bottom portion cannot suddenly fold upwards under load.

Transmission of the forces acting on the bottom portion or on the main frame to the suspension device of the rescue net takes place via an outer peripheral wall converging upwards from the edge of the floor. This preferably comprises a net-like structure protecting the persons held, wherein the net is expanded at its upper end by a frame to widen the inner space it provides.

The upper frame has a continuous periphery and has a form, similar to, but scaled down from that of the main frame. A square construction of the frames has proved highly useful, particularly with respect to advantageous load distribution and associated considerable freedom from vibration. This configuration of the main frame and upper frame also allows the upper frame to be stowed completely within the collapsed main frame.

A high load-carrying capacity with relatively low weight of the rescue net is obtained when the net sections are manufactured from flat straps, for example consisting of nylon or polyester. These have high wear resistance and can be stitched together at their points of intersection, forming inherently firm surfaces which efficiently protect persons held in the rescue net. At the same time these kinds of net consisting of straps are readily collapsible, so that they can be spread out between the halves of the bottom portion and packed.

In order to protect persons from above and to stabilize the upper frame, a net is preferably disposed therein, for example comprising tensioning straps. The net in the main frame or in the upper frame comprises a mesh in the form of perpendicularly intersecting straps extending between opposite sides of the frame. In addition, straps extending diagonally across the frame between opposite corners may be provided.

Four net ladders of equal length extending between the parallel frames are preferably used as a network for the outer peripheral wall, with a space left between every two adjacent net ladders as an entrance opening. With a square construction of the frames and arrangement of the net ladders at the frame corners, an entrance opening of the same size is thus formed on each of the four sides of the frame.

The strap ends may be attached to the main frame and upper frame by looping them around the tubes of the main frame and upper frame respectively, with the straps of different nets adjoining in the longitudinal direction of the frame fixing each other mutually.

In a preferred embodiment, the four individual net ladders of the peripheral surface each consist of four straps extending between the frames, with these straps connected at common points of intersection to straps perpendicular to them and parallel to the bottom floor.

Preferably, tensioning straps extend from opposed locations on the upper frame to a common supporting ring and serve to suspend the cage-like rescue net. This supporting ring is then gripped by the load hook of the helicopter or by the auxiliary straps attached to the helicopter.

An example of a rescue net constructed in accordance with the invention will now be described with reference to the accompanying drawings, in which:

FIGS. 3b, 3c, 3d, 3e show auxiliary straps, for suspension of the net from a helicopter;

FIG. 4a shows a fork joint for a hinge connection of the U-shaped frame members of the main frame, wherein the position of a locking pin is shown for fixing the U-shaped frame members;

FIG. 4b shows a cross section through the fork joint a hinge pin and a locking pin; and FIGS. 4c and 4d show a self-locking linch pin as another means for fixing the U-shaped frame members.

Figure 1:
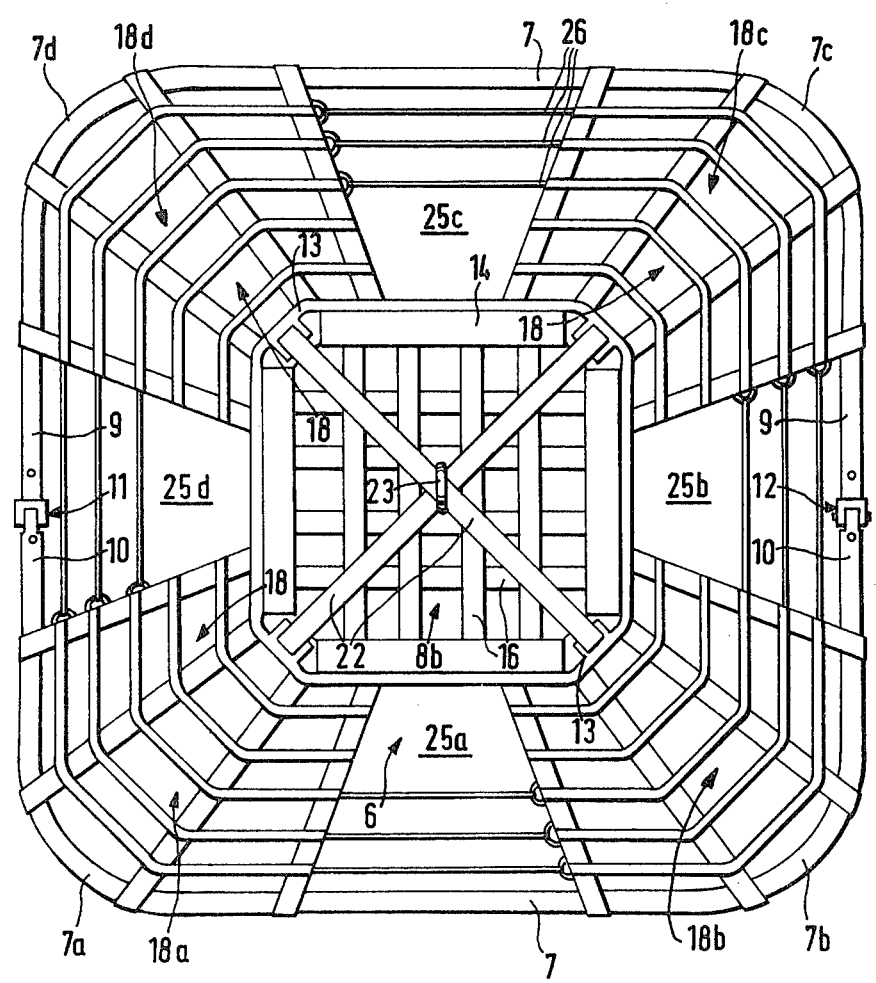
FIG. 1 shows a top plan view of an unfolded rescue net wherein the nets of the peripheral wall and upper frame only are depicted for sake of clarity.

The rescue net 1, reproduced in FIG. 1 in plan, consists of a main frame 7 formed by two U-shaped members 9,10 hinged along a common axis 5 at joints 11,12, and an upper frame 13 aligned with it, each frame having a generally square shape, Within the frames 7,13 and laterally between them are disposed nets, forming a cage-like structure tapering upwards.

A top net 8b fixed in the upper frame 13, is formed by intersecting straps 16. A conically upwardly converging net 18, which forms the outer peripheral surface of the cage 6, is divided into four individual net ladders 18a–18d disposed at the corners of the main frame 7, so that each of the four sides of the cage 6 has its own access opening 25a–25d. Retaining straps 26 are fixed at the center of the openings to secure the access openings and to provide additional stabilization of the four net sections 18a–18d.

Of the bottom portion 2, which comprises two relatively pivotable halves 3,4 and on which the persons to be rescued stand or lie, only the main frame 7, comprising the two U-shaped frame members 9,10 with fork joints 11,12, is reproduced in FIG. 1.

The four individual angle members 7a–7d, forming the main frame 7 and each of which forms one of the frame corners, are shown also.

Figure 2:
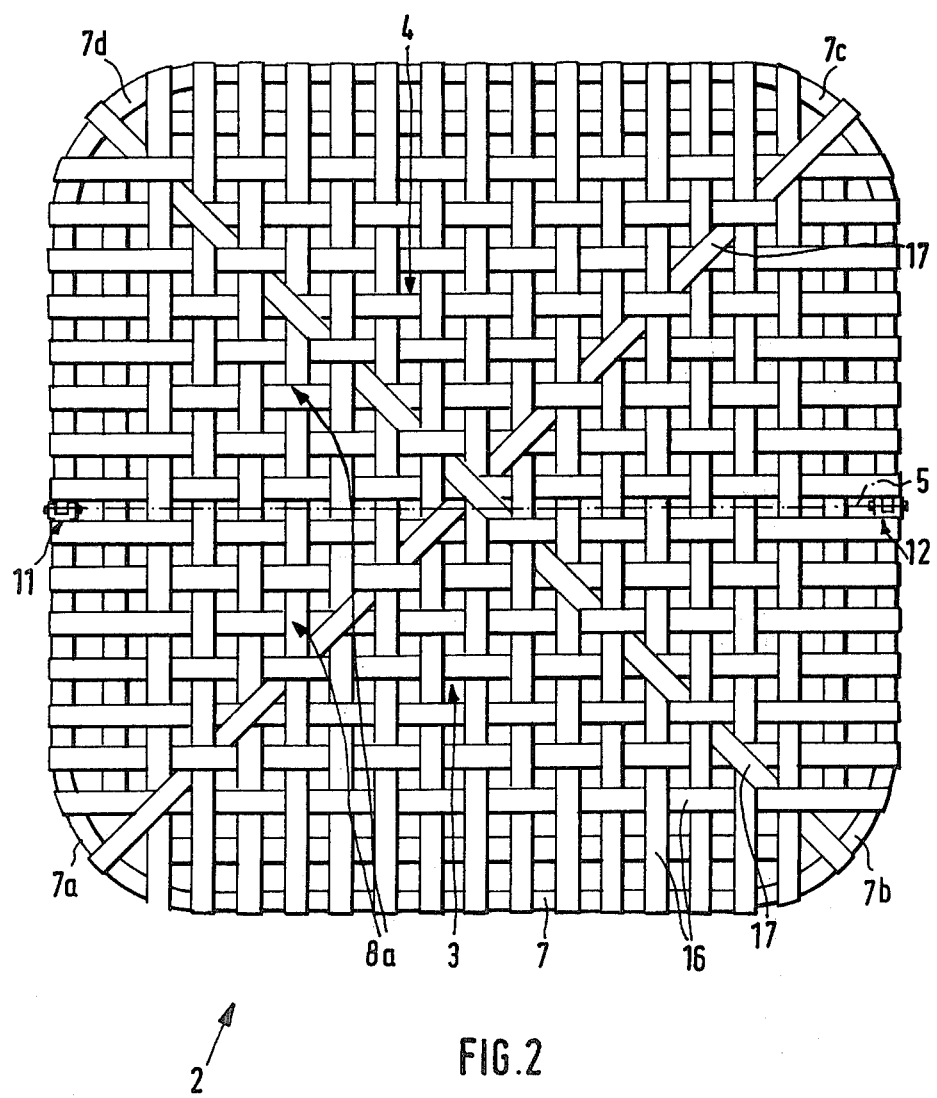
FIG. 2 shows the bottom portion of the rescue net shown in FIG. 1.

The main net 8a which forms the floor and is fixed in the main frame is not shwn in FIG. 1 for the sake of clarity. This net is shown in FIG. 2 in plan with the main frame which supports it. It is constructed of perpendicularly intersecting interwoven nylon or polyester straps 16 approximately 4.5 cm wide, with strap loops encompassing the tubes of the main frame. For further stabilization, two straps 17 extend diagonally from opposite frame corners and are woven into the network of straps 16.

Figure 3A:
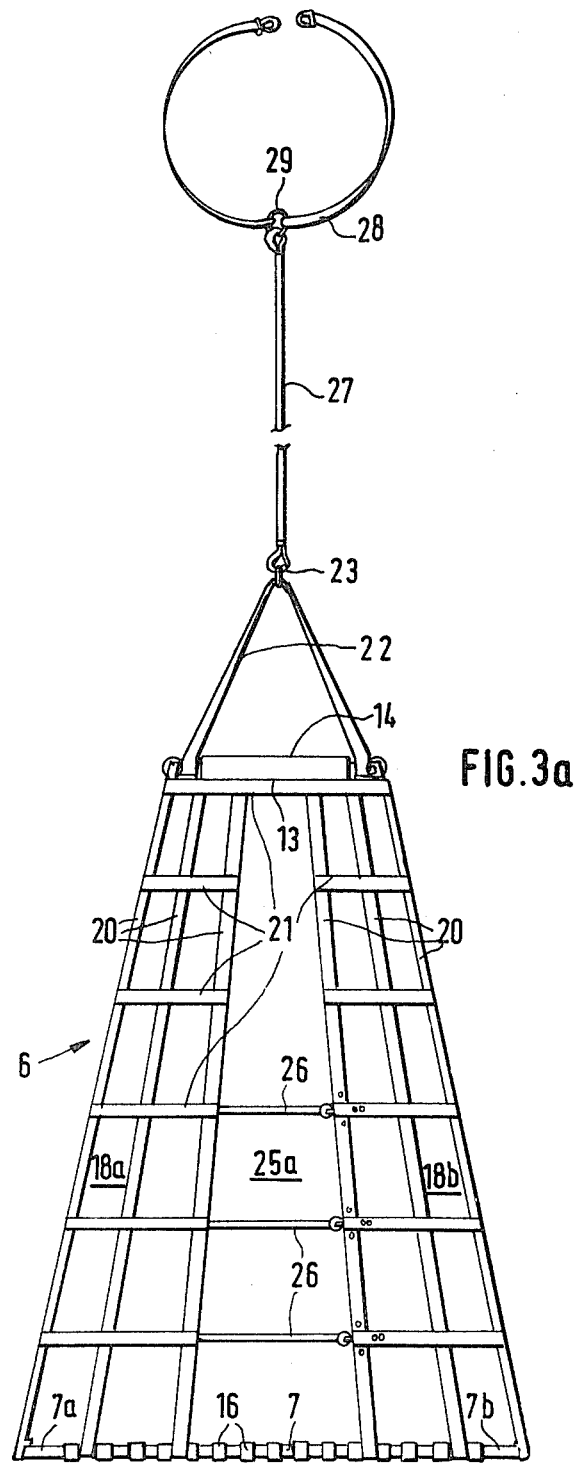
FIG. 3a shows a side view of the rescue net shown in FIG. 1, to depict the net ladders extending between two members of the two square frames one above the other, with an entrance opening disposed between them.

The construction of the individual net ladders 18a–18d forming the outer peripheral wall, with access openings 25a–25d in between, is shown in FIGS. 1 and 3a.

Each net ladder comprises four nylon or polyester straps 20, 4.5 cm wide, extending in the longitudinal direction of the peripheral wall between the upper frame 13 and the lower frame 7. Straps 21, extending parallel to the floor and to the main frame 7, serve to fix the straps 20 together for example by stitching or riveting at the points of intersection.

Except for the uppermost of the straps 21, all the others extend, not over the whole circumference of the peripheral surface, but only over the four individual nylon straps 20 of each net ladder 18a–18d, so that the access openings remain free between these nets and optionally only the suspended retaining straps 26 block the entrance. For head protection, the upper frame 13 is surrounded by four foam rubber pads 14.

Tensioning straps 22 extending from the four corners of the upper frame 13 and converging at a common supporting ring 23 serve to suspend the cage 6 by means of auxiliary straps attached to the helicopter or a load hook. A particularly simple embodiment is shown in FIG. 3a, where only two tensioning straps 22 are required, each of these straps extending through the ring 23 and then passing downwards to the adjoining angle member.

As can be seen from FIGS. 3b–3e, the auxiliary straps comprise a supporting strap 28 with abrasion-resistant means 28' and a load ring 29 to which is attached an extender strap 27 from which in turn is suspended the rescue net (see FIG. 3a). The supporting strap 28 extends through the helicopter where it is connected by its ends. With a suitable mounting, the supporting ring is located directly beneath the helicopter.

When rescue net 1 is not suspended from the supporting ring 23 or is not otherwise lifted, the peripheral wall can be collapsed and the upper frame 13 placed on one of the halves 3 or 4 of the bottom portion 2, so that these can then be folded up, enclosing the remaining net portions.

The U-shaped frame members 9, 10 are pivotable inwardly towards one another and upwardly towards the peripheral wall, about the common axis 5 by means of the joints 11,12 to a closed position which the two halves 3,4 with their main net 8a receive the remainder of the rescue net 1 like a cage.

In order to prevent collapse of the bottom portion 2 during use, the joints 11,12 comprise special means for locking them in a fixed position so that the two halves 3,4 can be securely fixed relative to one another when in the opened position.

As can be seen from FIGS. 4a–4d, the joints 11,12 have a fork member 30 and a hinge plate 31 extending upwards, so that a locking pin 33 extending through the fork 30 and hinge plate 31, to lock the joints 11,12 and main frame 7, can be introduced into a bore 34 parallel to and above a screw threaded hinge pin 24 which is secured with split pins.

For easier handling and locking of the pin 33, a wing nut 35 and a knurled wheel 36 are formed on it, and a lock ring 37 is provided for attachment of a split pin 38 for the locking pin 33.

The introduction of the locking pins 33 for locking the joints 11,12 into the bores 34, is a simple procedure since each of the bores 34 is aligned in the open position of the main frame 7; however a self-locking linch pin 33' is preferably used.

This kind of linch pin has the advantage that no special split pin has to be used to secure it. On the contrary, it is locked automatically on insertion into the bore 34. To lock the joints 11,12 the pin 33' is introduced into the bore 34 by pressing a knob 39. In the process, a locking means 41, which normally lies outside the pin shaft 40, is retracted into the shaft 40. If the knob 39 is then released, automatic locking takes place to the extent that the locking means 41 is fixed in a groove for example in the wall of the bore 34.

Apart from extremely simple rapid locking by this kind of pin, there are also advantages in that the linch pin 33' can be relatively short, so that the split pin 38 and special external locking devices can be eliminated.

This kind of linch pin can be obtained from the firm AVDEL Ltd., Welwyn Garden City, Hertfordshire, England under the name PIP PINS, single acting "T" handle Ball-Lok, BL-TA.

We claim:

1. A cage-like rescue net attachable to a helicopter and the like comprising: a bottom portion defining a floor for persons or articles to be rescued; and an outer net-like peripheral wall attached to said bottom portion and defining at least one access opening; said bottom portion comprising two halves pivotable one towards the other about a common axis to an open position in which said two halves are pivoted outwardly away from one another to form said floor during use of the rescue net and to a closed position in which said two halves are pivoted inwardly towards one another and upwardly towards said peripheral wall to effectively enclose and stow the remaining portions of the rescue net during non-use of the rescue net.

2. A rescue net according to claim 1, wherein said bottom portion is substantially square and includes an outer main frame, a main net being provided within and attached to said main frame to form said floor.

3. A rescue net according to claim 2, wherein said main frame comprises two pivotally connected, U-shaped frame members, said frame members being of substantially identical size.

4. A rescue net according to claim 2, wherein said main frame comprises four aluminum tubes of equal diameter, each of said tubes providing a corner portion of said frame.

5. A rescue net according to claim 3, wherein said U-shaped frame members are pivotally connected, said connection being provided by a pair of hinged joints.

6. A rescue net according to claim 5, wherein each of said hinge joints comprises a forked joint, said joint including a hinge pin defining a hinge axis and defining a bore parallel to said hinge axis, and a locking pin engagable in said bore thereby to fix said joint and thus said frame members in said open position.

7. A rescue net according to claim 1, wherein an upper frame is disposed above said bottom portion, said peripheral wall comprising a net extending between said bottom portion and said upper frame.

8. A rescue net according to claim 2, wherein an upper frame is disposed above said main frame, said upper frame having a substantially square configuration, and wherein the length of said upper frame is less than or equal to half the length of said main frame.

9. A rescue net according to claim 1, wherein said floor and said peripheral wall each comprise a plurality of straps arranged to intersect one another.

10. A rescue net according to claim 9, wherein said straps are attached to one another at said points of intersection.

11. A rescue net according to claim 9, wherein said straps comprise nylon.

12. A rescue net according to claim 9, wherein said straps comprise polyester.

13. A rescue net according to claim 7, wherein said upper frame comprises a plurality of straps, said straps of said bottom portion and said straps of said upper frame each being arranged in orthoginal sets, said sets extending between opposite sides of said portion and said frame respectively; and a pair of additional intersecting straps extending diagonally between the opposite corners of each of said bottom portion and said upper frame.

14. A rescue net according to claim 7, wherein said peripheral wall comprises four net ladders, each of said ladders extending between said upper frame and said bottom portion, and each adjacent pair of said net ladders defining a space therebetween to form access openings to said rescue net.

15. A rescue net according to claim 14, wherein each of said net ladders comprises four straps extending between said bottom portion and said upper frame, and a plurality of straps extending substantially perpendicular thereto and parallel to said bottom portion.

16. A rescue net according to claim 7, further including a supporting ring, and a plurality of straps, said straps extending from said upper frame to said supporting ring.

17. A rescue net according to claim 1, wherein said net comprises two square frames, a first of said frames, comprising a main frame, having an edge length of 165 cm, and a second of said frames, comprising an upper frame, having an edge length of 66 cm, said frames being spaced 220 cm apart in the operative position, and said floor and peripheral wall comprising a plurality of nylon or polyester straps 4.5 cm wide.

* * * * *